United States Patent [19]

Blunier

[11] 4,141,125
[45] Feb. 27, 1979

[54] METHOD OF MOUNTING TRACK PIN

[75] Inventor: Dennis L. Blunier, Danvers, Ill.

[73] Assignee: Caterpillar Tractor Co., Peoria, Ill.

[21] Appl. No.: 857,949

[22] Filed: Dec. 6, 1977

Related U.S. Application Data

[63] Continuation-in-part of Ser. No. 644,372, Dec. 24, 1975, abandoned.

[51] Int. Cl.² .................. B21H 7/00; B21K 19/00
[52] U.S. Cl. .................. 29/148.3; 29/DIG. 35; 29/447; 29/525; 74/250 R; 148/145; 305/58 R
[58] Field of Search ............... 29/447, 525, DIG. 35, 29/148.3; 148/145; 74/250; 305/58

[56] References Cited

U.S. PATENT DOCUMENTS

| 1,390,324 | 9/1921 | Worth | 74/250 |
| 2,739,486 | 3/1956 | Edwards | 74/250 |
| 3,365,246 | 1/1968 | Otis et al. | 305/58 X |
| 3,579,805 | 5/1971 | Kast | 29/447 |
| 3,659,112 | 4/1972 | Stedman | 305/58 |

Primary Examiner—Charlie T. Moon
Attorney, Agent, or Firm—Sheldon R. Meyer

[57] ABSTRACT

A track pin has the ends thereof mounted in bores defined by respective track links. The ends of the track pin are heated above the critical temperature of the steel making up the track pin, and then quenched, whereby the ends of the track pin have increased in volume to be retained in the bores of the respective track links.

2 Claims, 2 Drawing Figures

METHOD OF MOUNTING TRACK PIN

This is a Continuation-in-part of Ser. No. 644,372 filed on December 24, 1975, now abandoned.

BACKGROUND OF THE INVENTION

This invention relates to track pins, and more particularly, to a method of mounting a track pin to track links.

U.S. Pat. No. 3,739,486 and U.S. Pat. No. 1,390,324 disclose various means for mounting track pins to respective track links of a vehicle. In U.S. Pat. No. 2,739,486, it appears that the ends of a track pin are upset by great force applied thereto. In the case of U.S. Pat. No. 1,390,324, threaded members of tapered configuration are inserted into threaded bores in the respective ends of a pin to spread the ends of such pin to hold it against removal from the link. It will be understood that relatively great care must be used in applying the force necessary as disclosed in U.S. Pat. No. 2,739,486, to avoid damage to adjacent parts. And, U.S. Pat. No. 1,390,324 requires relatively complex configuration of parts which must be accurately machined to effectively operate.

SUMMARY OF THE INVENTION

It is accordingly an object of this invention to provide a method of mounting a track pin to track links which is extremely simple and which does not require complex machining, or application of great force in order to so properly secure the track pin to the track links.

Broadly stated, the invention comprises a method of mounting a track pin to a track comprising positioning an end of the pin in a bore defined by the link. The pin is heated adjacent such end positioned in the bore to cause a volumetric increase of the end of the pin. The pin is then quenched adjacent the end thereof, whereby a volumetric increase of the end of the pin remains, to secure the pin relative to the track link.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
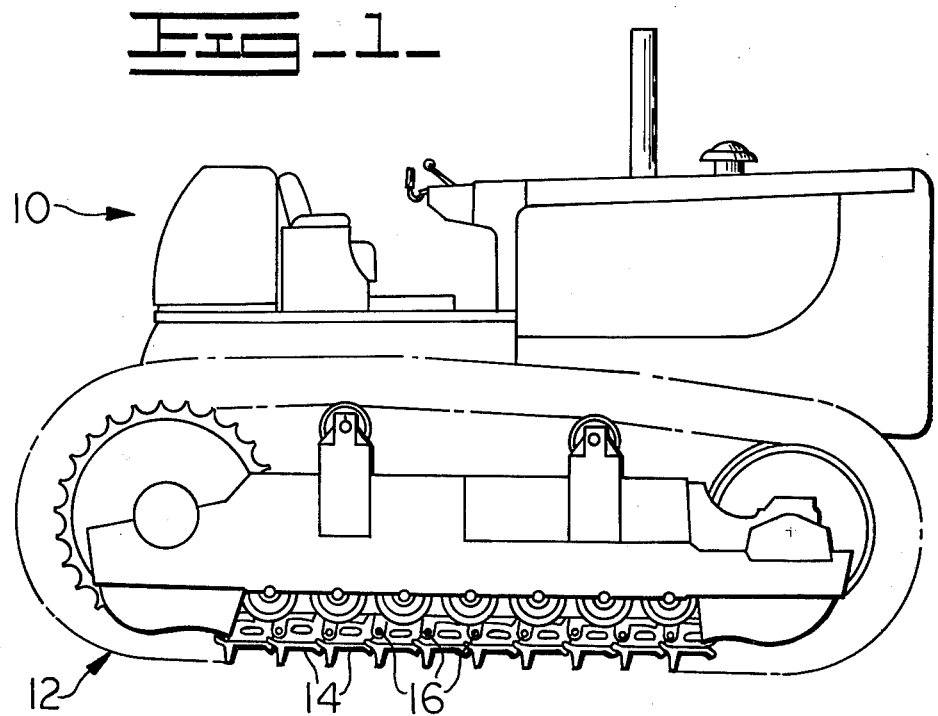
FIG. 1 is a side elevation of a vehicle incorporating a track having pins mounted therein in accordance with the present invention.
Figure 2:
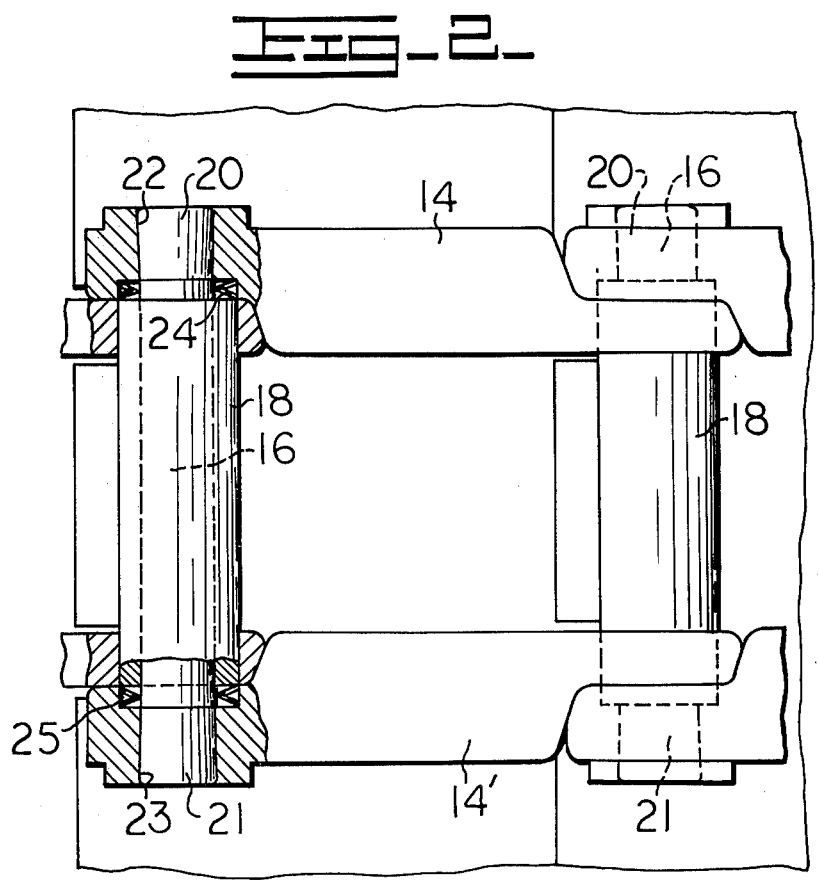
FIG. 2 is a plan view, partially in section, of a portion of the track of the vehicle of FIG. 1, showing the pins mounted to the track links.

Shown in FIG. 1 is a vehicle 10 which includes a track 12 made up of a plurality of track links 14,14' secured relatively together by steel pins 16, as is well known. The connection of such links 14,14' and pins 16 is best shown in FIG. 2.

As shown therein, the pin 16 is of cylindrical configuration, and is surrounded by a bushing 18 which is associated with the ends of links 14. The ends 20,21 of the pin 16 extend on either side of the bushing 18, and the ends 20,21 of the pin 16 are press fitted into the cylindrical bores 22,23 defined by the links 14,14', respectively. A seal 24 is disposed about the pin 16 between one end of the bushing 18 and the link 14, and a seal 25 likewise is disposed about the pin 16 between the opposite end of the bushing 18 and the link 14'.

With the parts positioned as thus far described, heat is applied to an end 20 of the pin 16 by means of, for example, an induction coil (not shown). Such end 20 of the pin 16 is heated to a point above the critical temperature of the steel making up the pin 16.

Subsequent to such application of heat, the pin 16 is quenched adjacent such end 20 so that a volumetric increase of that end 20 of the pin 16 is retained, to secure the pin 16 relative to the track link 14. The volumetric change is the end 20 of the pin 16 is shown as exaggerated in FIG. 2 for clarity.

As would be obvious to one of ordinary skill in the art, SAE 1040 steel may be used, for example in a particular embodiment, as the material for such pin 16, the critical temperature thereof being approximately 1550° F. Further as would also be obvious to one of ordinary skill in the art, an entire range of steel, including but not limited to SAE 1030 to SAE 1050 steel, may be used on the material for pin 16, the critical temperatures ranging from approximately 1600° F. to approximately 1400° F. As discussed in the Seventh Edition of MARKS' STANDARD HANDBOOK FOR MECHANICAL ENGINEERS, copyrighted in 1967 by McGraw-Hill, Inc., and especially on page 6–17 thereof, the critical temperature is that temperature at which phase changes occur in the above indicated steels. (Also see the U.S. Steel publication SUITING HEAT TREATMENT TO THE JOB) As is well known in the art, a volumetric increase accompanies the phase change, which volumetric increase is retained when the steel is quickly quenched. It is noted that additional steels and the cooresponding critical temperatures can quite easily be determined from the well known Iron-Carbon Equilibrium Diagram.

The opposite end 21 of the pin 16 is then operated on in the same manner, to secure the end 21 of the pin 16 to the link 14'.

By press fitting the ends 20,21 of the pin 16 in the bores 22,23, it is insured that the pin 16 does not stretch to a great extent upon application of heat thereto, such stretching being undesirable because it could interfere with the proper seating of, for example, the seal 24 between the link 14 and the bushing 18, changing the distance therebetween.

I claim:

1. A method of mounting a metallic track pin to a metallic track link, wherein the metallic track pin is comprised of a metallic material which undergoes a volumetric expansion upon heating and retains the volumetric expansion upon quenching, comprising;

press-fitting an end of the pin in a bore defined by the link;

heating the pin adjacent said end positioned in said bore to cause a volumetric increase of the end of the pin; and quenching the pin adjacent said end, whereby a volumetric increase of the end of the pin remains, to secure the pin relative to the track link.

2. The method of claim 1 and further comprising the steps of providing the bore of substantially cylindrical configuration, and providing the pin of substantially cylindrical configuration.

* * * * *